March 23, 1971  A. E. RODELY  3,572,117
BLUFF BODY FLOWMETER
Filed May 27, 1968  2 Sheets-Sheet 1
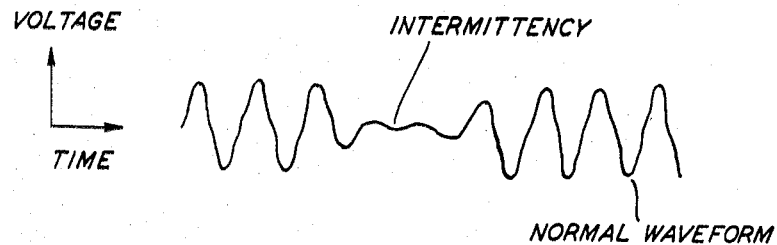
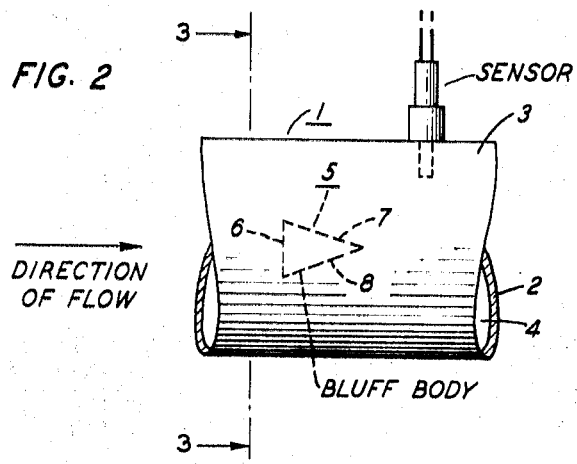
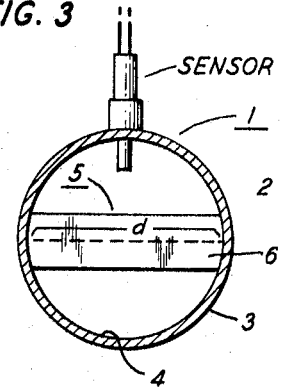
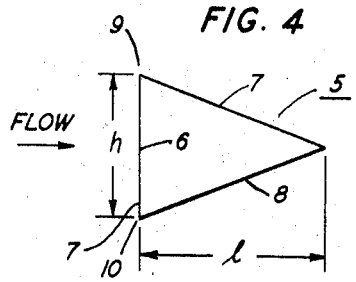
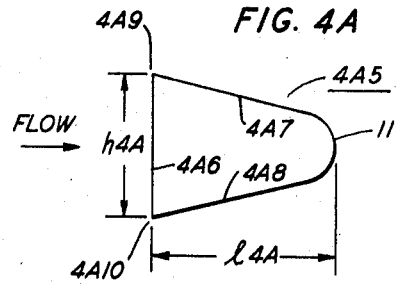
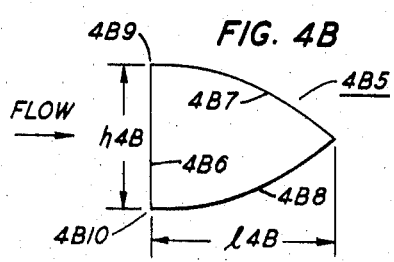
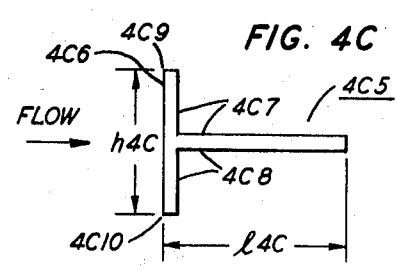
INVENTOR
ALAN E. RODELY
BY Frederick W. Padden
ATTORNEY March 23, 1971    A. E. RODELY    3,572,117
BLUFF BODY FLOWMETER
Filed May 27, 1968    2 Sheets-Sheet 2

INVENTOR
ALAN E. RODELY
BY Frederick W. Padden
ATTORNEY

United States Patent Office 3,572,117
Patented Mar. 23, 1971

3,572,117
BLUFF BODY FLOWMETER
Alan E. Rodely, Watchung, N.J., assignor to
Eastech, Inc., Watchung, N.J.
Filed May 27, 1968, Ser. No. 732,238
Int. Cl. G01p 1/00
U.S. Cl. 73—194                                    19 Claims

ABSTRACT OF THE DISCLOSURE

Flowmeters utilizing nonstreamlined, bluff bodies and sensors are disclosed for generating oscillating wakes in a fluid flowing through a pipe to produce high signal-to-noise signals which are free from intermittency and are sensed outside of the wake in the flow near and upstream from the bodies. Each of the bodies comprises prescribed geometric configurations and includes a base surface facing the flow and downstream surfaces to control the oscillatory flow. The bodies each have sharp upper and lower corners at the edges of the facing base surface for defining separation lines for the flow. The facing base surfaces are selectively blunt or convex for reducing pressure loss in the pipe due to the bluff body.

---

This invention relates to flowmetering equipment and particularly to bluff body devices each of which is selectively mountable individually within a conduit for producing in a flowing fluid oscillating signals which vary in frequency in accordance with the flow and which have a high signal-to-noise ratio as well as freedom from intermittency.

The development of metering instruments has progressed in recent years to the extent that equipment is currently available for generating an oscillatory motion in a fluid flowing through a pipeline and for converting the frequency of such oscillation into signals related to the volumetric flowrate through the pipeline. It is known in the art to use a nonstreamlined, or bluff, body mounted within a pipeline so that when a fluid passes over the body a wake is generated which oscillates at a frequency related to the flowrate. The frequency of such oscillation has heretofore been sensed directly within the wake by a variety of velocity and pressure sensors prior to its conversion into electrical signals representative of the flow through the pipeline.

Despite such progress and a substantial amount of persistent fluid mechanics research, prior art bluff body flowmeters have proven too complicated and costly to warrant their widespread commercial use for measuring flow. In addition, the accuracy of measurement with such flowmeters has generally been dependent upon frequent, burdensome and time consuming calibration procedures to compensate for the nonlinearity of the system as well as signal intermittency.

The foregoing deficiencies exist principally due to the character of the oscillating wake generated by the prior art bluff bodies. Specifically, the prior art teaches bluff bodies of geometrical configurations which are mounted within a pipeline for generating oscillating fluid flow signals within a wake and which signals undesirably are not regularly occurring, but are randomly intermittent and moveover are undesirably weak with respect to turbulent flow fluctuations.

In view of the foregoing, it is apparent that a need exists for facilities which reduce the cost and complexity of bluff body flowmeters while providing for accurate measurement of the flow through a conduit. A further need exists for bluff body devices which provide for the generation of oscillating flow signals with a high signal-to-noise ratio and freedom from intermittency. Freedom from intermittency as indicated herein refers to that signal condition wherein variations in signal amplitude at a given flowrate are within a predetermined range and do not interfere with accurate and repeatable measurement of signal frequency.

The foregoing and other needs are fulfilled in accordance with specific illustrative embodiments of my invention which are more fully understood from a reading of the following description thereof with reference to the drawing in which:

FIG. 1 is a voltage versus time graph of an electrical waveform depicting an oscillating flow in a wake produced by a bluff body within a pipe in accordance with prior art bluff body flowmeters;

FIG. 2 shows a triangular bluff body mounted along the inner diameter of a pipe with an electrical sensor mounted through the periphery wall of the pipe in accordance with my invention;

FIG. 3 is a cross-section view of the mounting of the bluff body within the pipe of FIG. 2;

FIG. 4 shows the bluff body used in the structure of FIGS. 2 and 3;

FIGS. 4A through 4C, 5A through 5C, 6A and 6B illustrate other exemplary bluff bodies used in flowmeters according to my invention;

Figure 7:
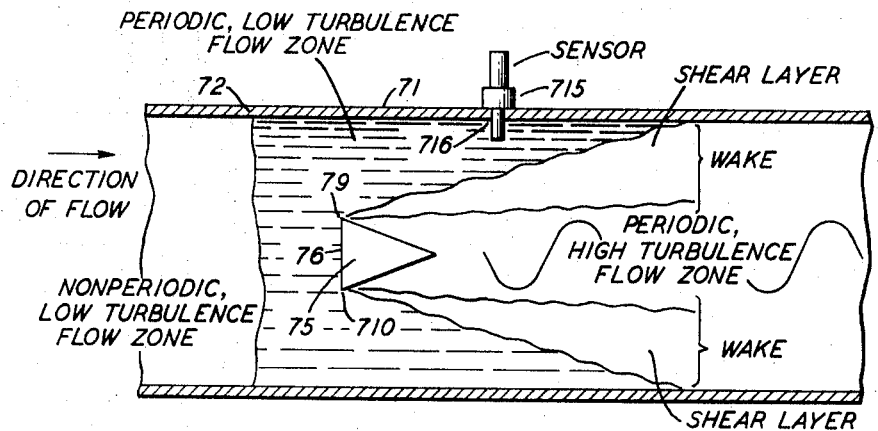
Figure 8:
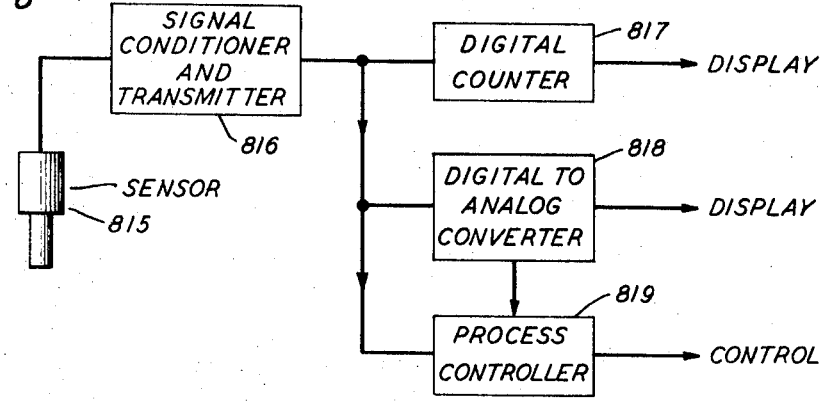

FIG. 7 schematically shows the flow zones created by the bluff body within a pipe together with the location of a sensor outside of the wake in accordance with my invention; and FIG. 8 shows the circuitry utilized for translating sensed flow signals into indications of flow.

Before proceeding with a description of the specific exemplary embodiments of my invention, it is desirable to refer to FIG. 1 which shows a signal somewhat idealized and representative of that sensed by a sensor of a prior art bluff body flowmeter within the wake produced by that body. Importantly, it is noted that such a signal varies in frequency in accordance with flow and has an intermittency where the signal becomes very weak and often nonexistent in amplitude. Such an intermittency occurs at random unpredictable periods during a flow and therefore generally precludes accurate flow measurements even with sophisticated signal translating apparatus and calibrating procedures.

The foregoing deficiencies and problems of intermittency are solved by a plurality of bluff body devices and sensor arrangements in flowmeters according to my invention. To elaborate, my invention provides a flowmeter combination including a conduit having a wall means defining a hollow inner chamber containing a flowing fluid and a stationary bluff body with no moving parts. The body is mounted within the chamber transverse to its longitudinal axis for interacting with the flowing fluid to produce an oscillatory fluid flow free of intermittency and of a frequency corresponding to the flowrate. According to my invention, the bluff body advantageously comprises one of a plurality of geometrical configurations with first, or base, side surface and second side surfaces of prescribed height and lengths to achieve the nonintermittent oscillating flow. In particular embodiments of my invention, the corners of the bluff body facing upstream in the flow are advantageously sharp to define fixed lines along which the flow past the body separates. It is another aspect of my invention that the surfaces of the base of the bluff body facing the flow are selectively flat or blunt convex to provide the desired nonintermittent oscillating fluid flow and to provide for flowmeter operation over a wider range of flowrates.

A distinctive aspect of my invention is the geometrical dimensions of the bluff body utilized to achieve the nonintermittency in the oscillating fluid flow. I have discovered that the ratio of the axial length of the body to the height of the base side of the bluff body facing the flow is advantageously between 1 and 2. In addition, the ratio of the height of the base side to the inner dimension of the inner chamber transverse to the longitudinal axis thereof is advantageously between 0.15 and 0.4. My invention further provides for a convex, or blunt, surface of the base side to increase the range of the flowrates measurable by my flowmeters. Moreover, a dimensional length between a frontmost surface of the base side to its sharp corner edges with respect to that of the height of the base is of a ratio of 0.3 or less. In such bluff bodies with convex base side surface, the ratio of the axial length (axial length of the side surfaces of the bluff body plus the axial dimensional length between the frontmost surface of the base side to its corner edges) to the base height is advantageously between 1 and 2.

A salient feature of my invention is that a transducer, or sensor, senses the oscillating flow outside of a wake generated by the flow past the bluff body and illustratively produces output electrical signals free of intermittency and having a frequency that depends on the fluid velocity. Advantageously, the electrical signal has a high signal-to-noise ratio. Such noise is generated by turbulent fluid fluctuations within the chamber. It is within the scope of my inventive teaching to mount the sensor selectively through the wall of the conduit to sense oscillating flow near the body or upstream in the flow at a prescribed distance from the bluff body. Another embodiment provides for the mounting of the sensor on the base side of the bluff body facing the fluid flow and thereby providing for a unitary flowmeter structure.

My invention is utilized with a signal conditioner and transmitter to convert the output signals of the sensor into digital signals which are totalized or counted by a counter to display total flow or flowrate within a predetermined period. In addition, an analog converter converts the digital signals from the transmitter into analog signals which jointly with the digital signals control a process controller.

Turning our attention now to FIGS. 2 and 3, a specific embodiment of my invention is shown comprising a section of a conduit pipe 1 defined by a circular wall member 2 with an outer surface 3 and an inner surface 4 which forms a hollow inner cylindrical chamber for the flow of fluid therethrough. According to my invention, a bluff body 5 is mounted in a stationary, or fixed, position along the diameter of the hollow chamber transverse and normal to the longitudinal axis of the chamber and comprises a cross-sectional shape of an isosceles triangle with its shorter side, or base 6, with its surface facing forward and preferably normal to an incoming fluid flow. Body 5 comprises side members or downstream surfaces 7 and 8 of equal length. FIG. 4 shows the body 5 with base height $h$ and axial length $l$. A ratio of the axial length $l$ to the height $h$ of body 5 is between 1 and 2. A ratio of the height $h$ of base 6 to the inner diameter $d$ of the pipe 1 is between 0.15 and 0.4. Axial lengths and base heights within these limits prevent the flow streams passing above and below the body 5 from intermingling and interacting until a favorble distance downstream of the edges of the facing surface of base 6 and thereby desirably generating strong oscillatory flow without intermittency.

It is a feature of my invention that the bluff body 5 comprises sharp corners 9 and 10 at the respective upper and lower edges of the base 6 where they meet respective members 7 and 8, because such corners define the fixed lines along which a flow past the body 5 separates. Edges with rounded corners which allow the separation lines to shift as the flowrate varies are undesirable because they cause changes in the calibration factor with the flowrate. My invention is therefore a flowmeter which is highly linear over wide flowrate ranges.

FIGS. 4A through 4C show other geometric shapes for the body in accordance with my invention. Each of these bodies 4A5, 4B5 and 4C5 comprises respective base side surfaces 4A6 and 4B6 or 4C6 as well as respective axial side surfaces 4A7 and 4A8, 4B7 and 4B8, or 4C7 and 4C8. The respective ratios of the base height $h4A$, $h4B$ and $h4C$ to the axial length 14A, 14B and 14C of the bodies 4A5, 4B5 and 4C5 as well as the respective ratios of such heights to the inner pipe diameter are within the limits set forth priorly with respect to body 5 of FIGS. 2, 3 and 4. Each of the bodies 4A5, 4B5 and 4C5 is characterized by respective sharp corners 4A9, 4B9 and 4C9 together with 4A10, 4B10 and 4C10 at the respective upper and lower edges of bases 4A6, 4B6 and 4C6. Specifically, the body 4A5 comprises a flat base surface 4A6 with upper and lower edges thereof joined by respective ends of side surfaces 4A7 and 4A8 which are tapered therefrom toward a semicircular end segment 11. Body 4B5 includes a flat base surface 4B6 with respective upper and lower edges thereof meeting respective ends of arcuate downstream surfaces 4B7 and 4B8 which meet at the other ends thereof at a distance with in defined limit of the axial length from base 4B6. The body 4C5 is T shaped with a flat base surface 4C6 and downstream surfaces 4C7 and 4C8.

Figure 5A:
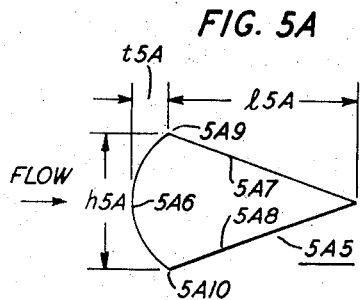
Figure 5B:
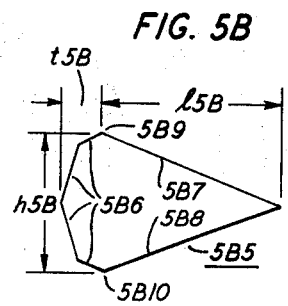
Figure 5C:
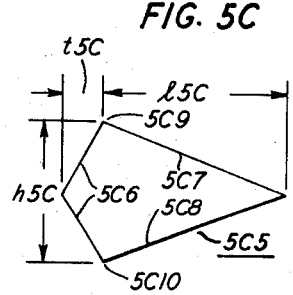

I have further discovered that the shape of the forward facing base surface of the bluff body influences the minimum flowrate needed through a pipe in order to maintain fluid oscillation. According to my invention, when the flow facing surface is a generally convex shape as indicated by the surfaces of bases 5A6, 5B6 and 5C6 of FIGS. 5A–5C, and the ratio of the axial dimension $t5A$, $t5B$ and $t5C$ to the respective base heights $h5A$, $h5B$ and $h5C$ is 0.3 or less, the minimum flowrate at which steady, high signal-to-noise ratio signals are found is reduced and thereby allows the flowmeter to be used over a wider range of flowrates. When the generally convex shape is enlarged so that the $t$ dimension is greater than $0.3h$, the oscillatory motion can be completely reduced to eliminate the detection of a regular, time-dependent signal in or out of the wake. For the foregoing convex shapes, the axial length is $l$ plus $t$, which advantageously is between 1 and 2 times the maximum transverse dimension $h$ of the base surface to produce high signal-to-noise ratio signals, free from intermittency. A further advantage achieved with my generally convex shape for the forward facing base surface is the reduction in the pressure loss in the pipe due to the bluff body. As shown in FIGS. 5A–5C, each of the bluff bodies 5A5, 5B5 and 5C5 comprises respective downstream surfaces 5A7, 5B7, 5C7, 5A8, 5B8 and 5C8 joined with the respective base edges to form sharp corners 5A9, 5B9, 5C9, 5A10, 5B10 and 5C10.

Figure 6A:
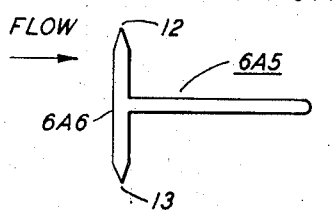
Figure 6B:
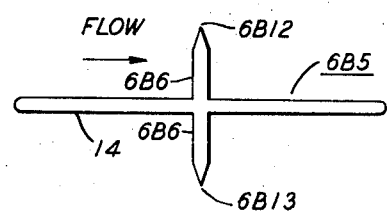

It is within the scope of my invention to add other structural elements to the basic bluff body to construct an overall shape which is outside of the priorly defined ratio limits and yet obtain high quality signals provided that such elements are shaped and oriented so that they do not substantially change the way the flow approaches or flows past the bluff body. Illustratively, the shape shown in FIG. 6A for the bluff body 6A5 approximates the T shaped body of FIG. 4C and comprises the pointed sharp corners 12 and 13 together with base height-axial length ratio limits defined hereinbefore. The bluff body 6B5 of FIG. 6B is cross-shaped and contains an added structural element 14 over the body 6A5 of FIG. 6A and secured along a midsection of base surface 6B6 to form a symmetrical bluff body which is advantageously utilized for measuring flow in either direction through a pipe. Element 14 serves to aid in straightening any undesirable swirl or skewness that may be present in the flow approaching the bluff body. The body of FIG. 6B is outside of the priorly defined ratio limits of between 1 and 2 and yet delivers high signal-to-noise ratio signals free of intermittency because element 14 does not substantially deflect a flow from its rectilinear path down a pipe.

According to my invention, the oscillatory flow signal generated individually with each of the foregoing shapes of bluff bodies and within areas about the bodies is advantageously free of intermittency which heretofore has been a problem in the prior art. In contrast to the prior art, I have found that my bluff body devices each furnish the highest signal-to-noise ratio in zones outside of the wake. As shown in the schematic of FIG. 7 wherein a triangular bluff body 75 is mounted along the diameter of a pipe 71, a facing surface of base 76 interacts with a fluid flow to produce an oscillating wake. The latter is that region which is bounded by and includes the shear layers which separate the periodic, high turbulence flow zone behind the body 75 from the periodic, low turbulence flow zone outside thereof. The wake zone commences proximate the sharp edged corners 79 and 710 of body 75 and spreads downstream from body 75 until it fills the entire pipe 71. In the upstream direction from body 75, the signals detectable in front of the body 75 get progressively weaker upstream and become almost completely buried in the turbulent flow fluctuations at approximately one bluff body length upstream from body 75.

It is another feature of my invention that sensor 715 is illustratively shown mounted through a sealed opening 716 in the wall 72 of pipe 71 at a location in the periodic, low turbulence flow zone within pipe 71 and outside of the wake shown in FIG. 7 to provide for high signal-to-noise signals which are free of intermittency. Sensor 715, by way of example, is suitably a force, pressure, velocity, displacement, temperature or density sensor presently available in the art. According to my invention, the bluff body flowmeter advantageously includes a sensor 715 selectively placeable out of the wake illustratively in FIG. 7 either in the fluid stream through pipe 71 or removed from direct contact with such stream and yet senses high signal-to-noise signals free from intermittency. It is within the purview of my invention to mount the sensor 715 on the facing surface of base 76 or to use the bluff body as a force summing means with a signal being produced by sensing the motion of the bluff body in accordance with the fluctuating fluid force on the body.

The illustrative embodiment of my invention operates primarily in response to the frequency rather than the amplitude of the fluid oscillation. Such oscillatory flow conditions as sensed by sensor 715 are converted by it into corresponding output electrical signals. As shown in FIG. 8, the sensor 815 applies the electrical signals to a signal conditioner and transmitter 816 which sends representative digital output signals to a digital counter 817 for digital totalizing or counting and display of the total flow or flowrate within a prescribed time. The digital output signals from transmitter 816 are also applied to an analog converter 818 for conversion to an analog form and analog readout of flowrate on an analog display meter (not shown). The digital output signals from transmitter 816 together with the corresponding analog signals from converter 818 are applied to a process controller 819 for process control operations.

It is to be understood that the hereinbefore described arrangements are illustrative of the application of the principles of my invention. Numerous other arrangements may be devised by those skilled in the art without departing from the spirit and scope of my invention. Illustratively, the body 5 of FIG. 4 comprises downstream surfaces 7 and 8 which meet or join together at a point at a prescribed distance downstream from the corners 9 and 10. It is within the inventive scope and teaching of my invention to alter the geometric configuration of body 5 of FIG. 4 so that the downstream surfaces 7 and 8 meet downstream from the corners 9 and 10 at a flat surface rather than at a point. It is important however that the aforementioned ratios of base and downstream surfaces as well as base to inner diameter be complied with in order to furnish the high signal-to-noise ratio signals which are free of intermittency.

What is claimed is:
1. In combination,
    a conduit having means defining a hollow inner chamber containing a flowing fluid,
    said chamber having a longitudinal axis,
    and a stationary bluff body positioned within said chamber transverse to said longitudinal axis thereof, said body having a first surface facing upstream in said flowing fluid and second surfaces extending from said first surface downstream in said flow through said chamber, said first surface having a prescribed dimension with respect to dimensions of said second surfaces, and said first and second surfaces by interacting with said flowing fluid producing in said chamber an oscillating fluid flow free of intermittency and of a frequency corresponding to said flowrate.
2. The combination in accordance with claim 1 wherein said bluff body surfaces interact with said flowing fluid to produce said oscillating fluid flow free of intermittency outside of an oscillating wake generated by the interaction of said flowing fluid and said body surfaces,
    and further comprising means sensing outside of said wake said oscillating fluid flow which is free of intermittency.
3. The combination in accordance with claim 2 wherein said sensing means senses said oscillating fluid flow which is free of intermittency within predetermined distances of said body and which is within prescribed areas of said body outside of said oscillating wake.
4. The combination in accordance with claim 2 wherein said conduit comprises a circular pipe means having a wall means with an inner surface defining said hollow inner chamber cylindrically with a defined diameter dimension relationship to a height dimension of said first surface,
    and said bluff body is positioned along said diameter dimension transverse to said longitudinal axis of said chamber.
5. The combination in accordance with claim 4 wherein said first surface has a height dimension, said second surfaces have an axial dimension, and the ratio of said axial dimension to said height dimension is within the limits of 1 and 2.
6. The combination in accordance with claim 5 wherein the ratio of said height dimension of said first surface to said diameter dimension of said inner chamber is between the limits of 0.15 and 0.4.
7. The combination in accordance with claim 6 wherein said first surface has upper and lower edges each of which is contiguous to an individual one of said second surfaces to form a respective sharp corner segment that defines a fixed line along with said fluid flow past said body separates.
8. The combination in accordance with claim 7 wherein said first surface has a convex surface with an axial dimension 0.3 or less than said height dimension of said first surface.
9. The combination in accordance with claim 5 wherein said bluff body comprises a cross-section substantially of triangular shape with said first surface being a base surface and said second surfaces being side surfaces of said stationary bluff body.
10. The combination in accordance with claim 9 wherein said base surface is substantially flat, said body further comprises another substantially flat surface, and said side surfaces terminate at said other flat surface downstream from said base surface.
11. The combination in accordance with claim 5 wherein said bluff body comprises a T shaped cross-section.
12. The combination in accordance with claim 5 wherein said bluff body comprises a substantially symmetrical cross shaped cross-section for measurement of flow in both directions through said chamber.
13. In a flowmeter arrangement having a conduit having means defining a hollow inner chamber for containing a flowing fluid and said chamber having a longitudinal axis and an inner diameter dimension, the invention comprising a stationary bluff body positionable within said chamber transverse to said longitudinal axis thereof, said body having triangularity in its shaped cross-section, a base surface with a prescribed height dimension facing upstream in said fluid flow through said chamber and side surfaces facing from said base surface downstream in said fluid flow, said height dimension of said base surface to said diameter dimension being a prescribed ratio, and interaction of said base and side surfaces with said fluid flow producing in said chamber an oscillating fluid flow free of intermittency and of a frequency corresponding to said flowrate.

14. The invention defined in claim 13 wherein said side surfaces comprise an axial dimension and said axial dimension to said height dimension being a predetermined ratio whereby interaction of said base and side surfaces with said fluid flow produce in said chamber said oscillating fluid flow free of intermittency and of a frequency corresponding to said flowrate.

15. The invention defined in claim 14 wherein said flowmeter arrangement further has means for sensing said oscillatory fluid flow free of intermittency and outside of an oscillating wake generated by the interaction of said flowing fluid and said base and side surfaces of said stationary bluff body.

16. A fluid mechanical arrangement of a bluff body having a first surface for facing upstream in a fluid flowing through a hollow conduit and having second surfaces, characterized in that said first and second surfaces have a prescribed dimensional ratio therebetween for enabling said surfaces to interact with said flowing fluid through said hollow conduit to produce therein an oscillating fluid flow free of intermittency and of a frequency corresponding to the flowrate.

17. The invention set forth in claim 16 further characterized in that said first surface has a predetermined height dimension having a prescribed ratio relationship to an inner diameter dimension of said conduit.

18. A bluff body for use in a pipeline flowmeter in which said body comprises a first surface having a height dimension and for facing upstream in a fluid flow through said pipeline, second surfaces having an axial dimension and for facing from said first surface downstream in said fluid flow through said pipeline, and the ratio of said axial dimension to said height dimension being within the limits of 1 and 2.

19. A bluff body for use in a pipeline flowmeter for interacting with a fluid through said pipeline to produce an oscillating fluid flow free of intermittency and of a frequency corresponding to the flowrate and in which said body comprises a surface having a height dimension and for facing upstream in said fluid flow through said pipeline, said pipeline having an inner diameter dimension, and the ratio of said height dimension of said facing surface to said inner diameter dimension being between the limits of 0.15 and 0.4.

References Cited

UNITED STATES PATENTS

| 3,116,639 | 1/1964 | Bird | 73—194 |
| 3,434,344 | 3/1969 | Brunner | 73—194 |

FOREIGN PATENTS

| 150,656 | 12/1962 | U.S.S.R. | 73—194 |

OTHER REFERENCES

Mair, W. A., The Effect of a Rear-Mounted Disc on the Drag of a Blunt-Based Body of Revolutions; The Aeronautical Quarterly, November 1965; pp. 350–360.

RICHARD C. QUEISSER, Primary Examiner

J. K. LUNSFORD, Assistant Examiner